(12) United States Patent
Cogo et al.

(10) Patent No.: US 12,446,602 B2
(45) Date of Patent: Oct. 21, 2025

(54) APPARATUS AND METHOD FOR PRODUCING DRY PASTA

(71) Applicant: WEALTH & RESEARCH TRADING LTD, Ta'xbiex (MT)

(72) Inventors: Vittorio Cogo, Cassola (IT); Matteo Cogo, Cassola (IT)

(73) Assignee: WEALTH & RESEARCH TRADING LTD. (MT)

( * ) Notice: Subject to any disclaimer, the term of this patent is extended or adjusted under 35 U.S.C. 154(b) by 612 days.

(21) Appl. No.: 17/596,771

(22) PCT Filed: Jun. 17, 2020

(86) PCT No.: PCT/IB2020/055643
§ 371 (c)(1),
(2) Date: Dec. 17, 2021

(87) PCT Pub. No.: WO2020/254977
PCT Pub. Date: Dec. 24, 2020

(65) Prior Publication Data
US 2022/0295838 A1    Sep. 22, 2022

(30) Foreign Application Priority Data
Jun. 21, 2019 (IT) .................. 102019000009801

(51) Int. Cl.
*A23L 7/109* (2016.01)
*A23B 2/10* (2025.01)
(Continued)

(52) U.S. Cl.
CPC .............. *A23L 7/109* (2016.08); *A23B 2/103* (2025.01); *A23B 2/90* (2025.01); *A23B 2/97* (2025.01); *A23L 5/36* (2016.08); *A23P 30/20* (2016.08)

(58) Field of Classification Search
CPC .......... A23L 7/109; A23L 3/0155; A23L 3/40; A23L 5/00; A23L 3/54; A23L 5/36;
(Continued)

(56) References Cited

U.S. PATENT DOCUMENTS 3,718,480 A  *  2/1973  Tremblay ................ A23L 7/109
                                                            426/496
3,908,029 A  *  9/1975  Fredrickson ............ A23L 7/109
                                                            219/701

(Continued)

FOREIGN PATENT DOCUMENTS

CN         106922798 A      7/2017
EP         3185648 B1       4/2020
(Continued)

OTHER PUBLICATIONS

Translation of CN 105942185A (Year: 2016).*
(Continued)

*Primary Examiner* — Drew E Becker
(74) *Attorney, Agent, or Firm* — LAUBSCHER & FRETWELL, P.C.

(57) ABSTRACT

A method for producing dry pasta comprising the steps of:
preparing with durum wheat flour, or soft wheat flour, and water a dough having humidity comprised between 25% and 35%;
placing the dough in a chamber in which a vacuum is created comprised between 0.1 bar and 0.5 bar;
pushing the dough through a drawing device by applying to the dough pressure comprised 80 bar and 110 bar, to obtain food pasta in the form of units of long pasta or units of short pasta;
conveying and delivering said pasta to a dryer;
drying said pasta in said dryer until the humidity of the pasta is not greater than 12.5%, said drying including
(Continued)

heating said pasta in said dryer to a set temperature and maintaining the pasta at said set temperature for a set interval of time;

extracting said dried pasta from said dryer;

wherein said heating is obtained by passing the pasta inside an oscillating electromagnetic field having a frequency comprised between 10 MHz and 100 MHz.

An apparatus for producing dry food pasta including a kneading and drawing device configured for producing both long pasta and short pasta, a first dryer configured for drying long pasta produced by said kneading and drawing device, a second dryer configured for drying short pasta produced by said kneading and drawing device; said first dryer and said second dryer are equipped with a plurality of pairs of electrodes between which an electromagnetic field oscillating at a frequency comprised 10 MHz and 100 MHz is created by a generator of oscillating electromagnetic field.

10 Claims, 8 Drawing Sheets

(51) Int. Cl.
  *A23B 2/90* (2025.01)
  *A23B 2/97* (2025.01)
  *A23L 5/30* (2016.01)
  *A23P 30/20* (2016.01)

(58) Field of Classification Search
  CPC ... A23P 30/20; A21C 3/00; A21C 1/00; A21C 11/00; A21C 11/10; A21C 11/16–20; F26B 3/347; F26B 21/001; A21D 6/005; A21D 15/06; A23B 2/103; A23B 2/90; A23B 2/97
  See application file for complete search history.

(56) References Cited

U.S. PATENT DOCUMENTS

| | | | | | |
|---|---|---|---|---|---|
| 5,019,412 | A | * | 5/1991 | Hattori | A23G 3/52 219/731 |
| 5,364,651 | A | * | 11/1994 | Manser | F26B 15/126 425/315 |
| 5,989,620 | A | * | 11/1999 | Wang | A23L 7/109 426/443 |
| 9,585,419 | B2 | * | 3/2017 | Stromotich | A23L 3/01 |
| 2002/0187222 | A1 | | 12/2002 | Debbouz et al. | |
| 2004/0241311 | A1 | * | 12/2004 | Baianu | F26B 3/347 426/615 |
| 2008/0179318 | A1 | * | 7/2008 | Cornwell | A23L 19/03 219/686 |
| 2018/0103662 | A1 | * | 4/2018 | Rehkopf | A23B 7/02 |
| 2019/0343136 | A1 | * | 11/2019 | Durance | A23B 2/92 |
| 2020/0054050 | A1 | * | 2/2020 | Zhou | A23P 30/20 |
| 2020/0163365 | A1 | * | 5/2020 | Asahina | A23L 7/113 |
| 2020/0236980 | A1 | * | 7/2020 | Zhu | A21D 2/34 |
| 2022/0183329 | A1 | * | 6/2022 | Zhang | F26B 5/042 |

FOREIGN PATENT DOCUMENTS

| | | |
|---|---|---|
| GB | 2438958 A | 12/2007 |
| RU | 2104657 C1 | 2/1998 |
| RU | 2137397 C1 | 9/1999 |
| SU | 820787 A1 | 4/1981 |

OTHER PUBLICATIONS

Francesca Alberti, Radio-Frequency Technology for Fresh Stuffed Pasta Pasteurization/Pre-Drying Process: Preliminary Results, Materials and Methods, Jan. 1, 2012, pp. 62-65, URL: https://www.researchgate.net/publication/283743107_Radio-frequency_technology_for_fresh_stuffed_pasta_pasteurizationpre-_drying_process_Preliminary_results, retrieved on Feb. 17, 2020.

* cited by examiner

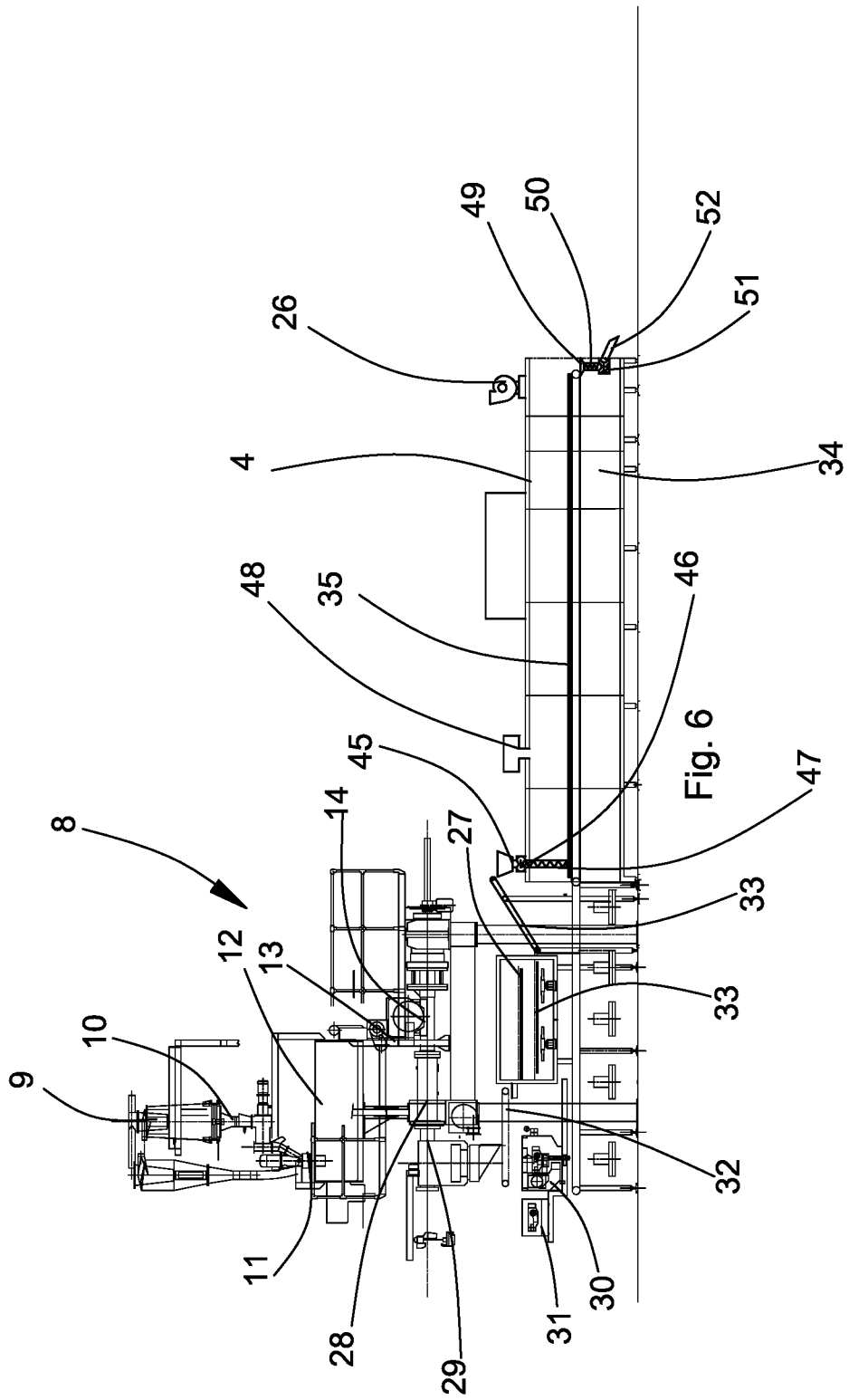

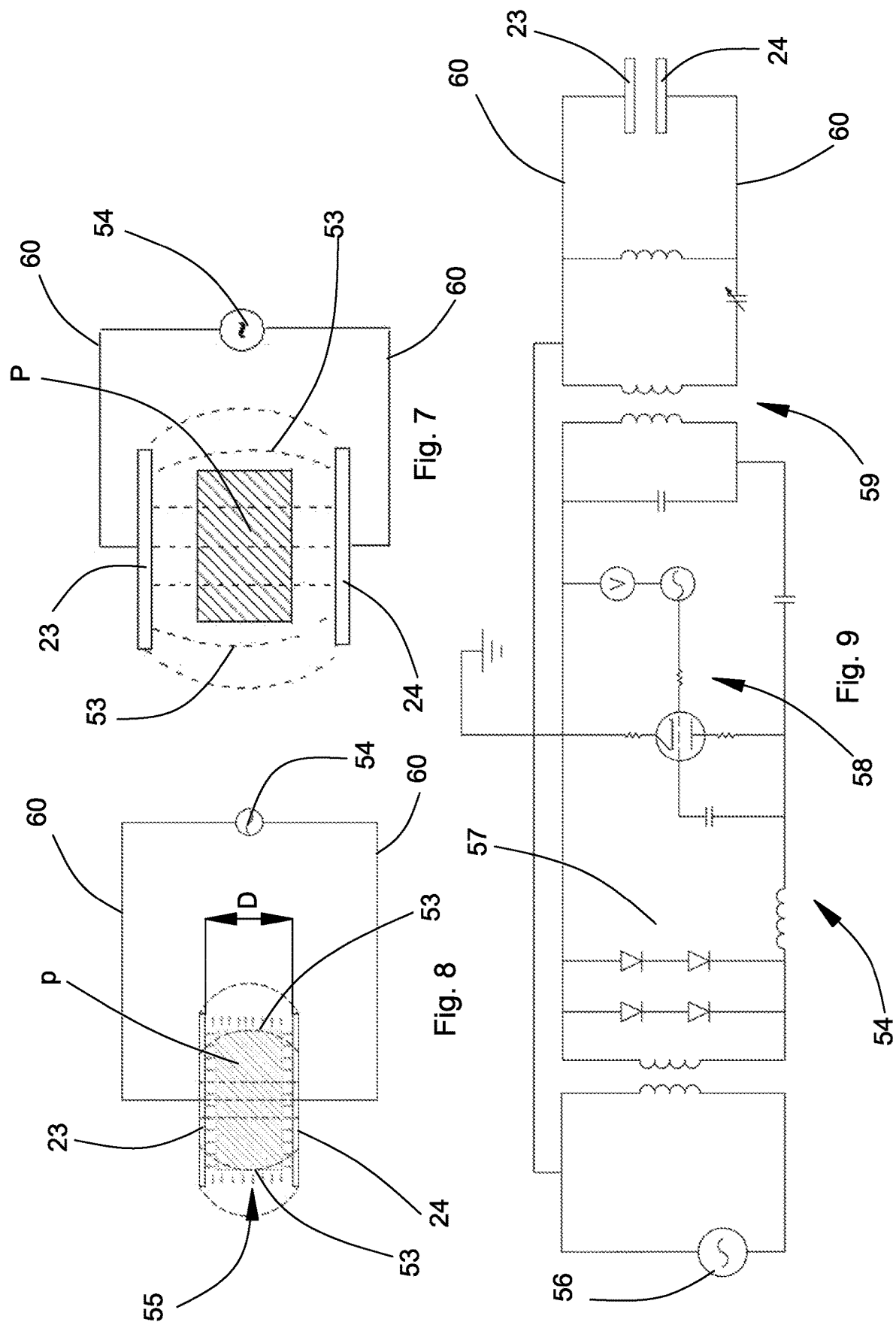

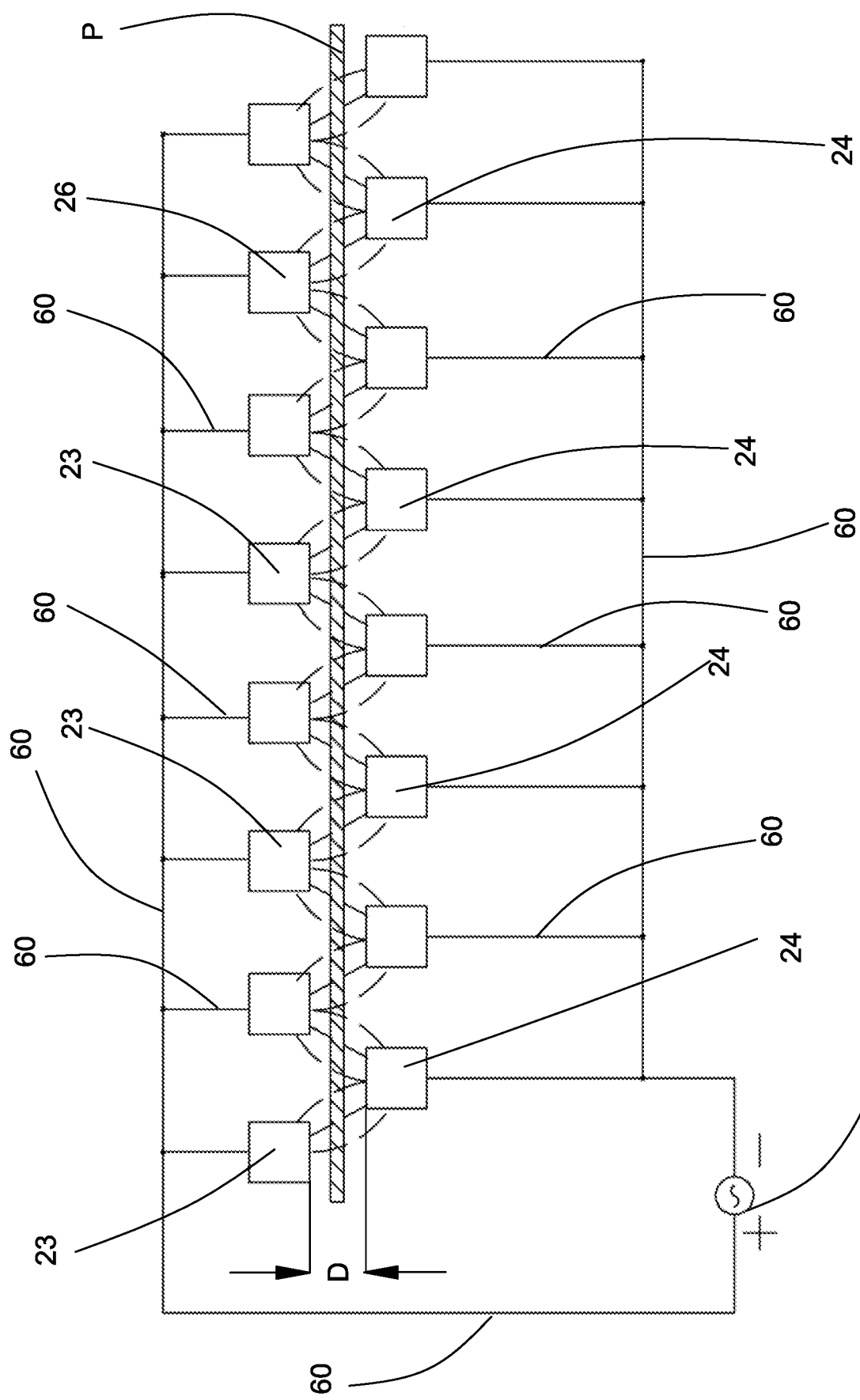

APPARATUS AND METHOD FOR PRODUCING DRY PASTA

CROSS-REFERENCE TO RELATED APPLICATIONS

This application claims priority of Application No. PCT/IB2020/055643, filed Jun. 17, 2020. Application No. PCT/M2020/055643 claims priority of application No. IT102019000009801 filed on Jun. 21, 2019. The entire content of these applications is incorporated herein by reference.

BACKGROUND OF THE INVENTION

The invention relates to an apparatus and a method for producing dry food pasta, in particular a method and an apparatus for drying food pasta produced with durum wheat flour, or with soft wheat flour, or with a mixture of durum wheat flour and soft wheat flour.

From the prior art, food pasta drying methods are known the object of which is to eliminate progressively from the product part of the initial water content, by administering heat, to lower the degree of humidity of the product. Lowering the degree of humidity means reducing enzyme activity, thus minimizing fermentation.

Drying can be provided in plants provided with suitable sources of heat that heat a mass of air that is subsequently sent into contact with the pasta to be treated to heat the pasta so as to evaporate progressively the humidity contained therein.

The steps of hot-air drying process are normally three: a first pre-drying step, a second drying step proper and a third stabilization step.

In the first pre-drying step, the pasta coming from a kneading apparatus and drawn through a drawing apparatus is in a plastic state, thus with the possibility of being deformed. In this first step, the pasta is heated rapidly with a great contribution of heat so as to reach the maximum obtainable value of the $Q/t$ ratio without damaging the pasta, where $Q/t$ is the quantity of humidity removed from the pasta per weight unit in the time unit.

The pre-drying step can be provided with a continuous pre-drying apparatus in which the pasta moves at a constant speed inside the apparatus and is hit by a continuous flow of hot air with a low level of humidity, coming from a heat exchanger. The flow of hot air causes heating of the pasta to evaporate the humidity that is contained in the pasta and to transfer the humidity to said flow of air.

The heat is transferred to the pasta in two modes: by convection from the flow of hot air to the surface of the pasta and by conduction from the surface to the inside of the pasta.

Also the transfer of humidity from the pasta to the flow of hot air that flows over the pasta occurs in two different modes: by diffusion from the inner layers of the pasta to the surface and by evaporation from the surface of the pasta to the flow of hot air.

At the end of the pre-drying step, the pasta is no longer in a plastic state, but in an elastic state. This means that temperature differences inside the pasta can cause internal tensions that, when they reach high values, may cause permanent deformation and also breakage in the pasta.

In order to avoid the occurrence of excessive tensions in the mass of pasta, during the drying step the transfer of heat from the flow of hot air to the pasta occurs more slowly, so that excessively high gradients are not created inside the pasta. This means that the humidity is removed from the pasta more slowly than in the pre-drying step. If with $Q_1/t$ the quantity of humidity is indicated that is removed from the pasta per weight unit in the time unit during the drying step, this quantity is less than the quantity $Q/t$ removed in the pre-drying step, i.e. $Q_1/t < Q/t$.

Also the drying step can be provided in a continuous drying apparatus that, normally, extends in height. The pasta is moved inside the apparatus from top to bottom whilst a flow of hot and dry air moves from bottom to the top.

In order to avoid drying defects it is important for the speed of the air inside the drying apparatus to be as constant as possible.

The drying step is deemed to be concluded when the residual humidity of the pasta does not exceed 12.5%, which is the maximum humidity value for dry pasta set by law.

At the end of the drying step, the pasta is subjected to a so-called stabilizing step, such that the humidity percentage is uniform throughout the mass of the pasta, in order to avoid, despite total residual humidity not being greater than 12.5%, the possibility of there being zones in the mass of the pasta with residual humidity greater than said value.

In the stabilization step, the pasta is maintained at a temperature above ambient temperature for a set time, at the end of which possible humidity gradients inside the mass of the pasta are zeroed.

Lastly, the pasta is cooled down to ambient temperature, to be subsequently packaged.

It should be noted that when the pasta is still in a plastic state, i.e. in the initial step of the drying process previously defined as pre-drying step, the transfer of humidity from the pasta to the flow of hot air depends essentially on the inner conditions of the drying apparatus, i.e. on the speed, temperature and humidity of the flow of air that hits the pasta. On the other hand, when the pasta has changed from the plastic state to an elastic state, at the end of the pre-drying step, the transfer of humidity from the pasta to the flow of hot air depends essentially on the diffusivity of the humidity inside the mass of the pasta.

The diffusivity of the humidity inside the pasta decreases as drying proceeds, which entails an inevitable extension of drying time.

In the drying processes with a flow of hot air that are known from the prior art, in order to reduce drying time, it has been proposed to raise the temperature of the flow of hot air up to about 100° C. But this entails the risk of damage to the proteins and to the amino acids contained in the pasta, with a resulting reduction of the nutritional value of the pasta that is greater the greater the temperature is of the air used in drying the pasta.

By using a high drying air temperature, comprised between 90° C. and 115° C., drying time can also be reduced to merely 2-3 hours, but pasta with low nutritional quality is obtained because of the changes to the gluten, to the proteins and to the amino acids caused by the high drying temperature.

Pasta of high nutritional quality is obtained by slow drying at a temperature that is not greater than 60° C. that damages neither gluten, protein or the amino acids contained in the pasta. But this entails long drying times, of the order of even 24-36 hours.

The processes of drying food pasta with hot air known from the prior art entail a significant expenditure of energy, which is necessary for heating the air and low energy efficiency, comprised in an interval between about 10% and 35%.

Further, the food pasta is not dried uniformly throughout the whole mass of the pasta, because heating is not uniform throughout the mass because the most external parts of the pasta are subjected to more intense heating than the most internal parts, with consequent non-uniformity in the features of the end product.

Lastly, it should be noted that drying food pasta by hot air requires different drying apparatuses for long pasta and for short pasta, with significant increased costs of making plants that can produce both long pasta and short pasta.

SUMMARY OF THE INVENTION

One object of the present invention is to provide a method of producing dry pasta, obtained from durum wheat flour, from soft wheat flour, or from mixtures of durum wheat flour and soft wheat flour, which enables the time to be reduced that is required for drying the pasta without there being alterations to the gluten, the proteins and the amino acids contained in the pasta, so as to obtain a pasta of high nutritional quality in a significantly shorter time than that required by drying with hot air at a low temperature not above about 60° C.

Another object of the present invention is to provide a method for drying food pasta that enables a product with uniform features throughout the mass thereof to be obtained.

A further object of the present invention is to provide a method for drying food pasta that enables the energy consumption to be reduced that is required per unit of mass of dried food pasta.

A still further object of the present invention is to provide an apparatus for producing dry pasta according to the method of the present invention that is usable for producing both long and short pasta and has reduced operating costs.

The objects of the invention are achieved by a method for producing dry pasta and with an apparatus for producing dry pasta.

Owing to the invention, it is possible to dry the pasta in a short time by maintaining the temperature of the pasta at values that do not damage the gluten, the proteins and the amino acids contained in the pasta.

It is further possible to obtain substantially uniform heating throughout the mass of the pasta, which enables the stabilization step to be eliminated that is requested in hot air drying plants.

Owing to the invention, it is possible to reduce considerably energy consumption per unit of mass of dried pasta, with significant production cost savings.

Further, there is little heat dispersal to the environment that surrounds the apparatus for producing pasta according to the invention and absence of smoke, steam and noise in the environment.

BRIEF DESCRIPTION OF THE DRAWINGS

Further features and advantages of the invention will be clear from the following description of embodiments of the invention, which are purely by way of example and are non-limiting, with reference to the enclosed drawings in which:

FIG. 6 is a section of the plant in FIG. 4, according to line B-B in FIG. 4;

FIG. 7 illustrates a first type of electrode for applying a radio-frequency magnetic field to the food pasta to be dried, in a plant for producing dry pasta according to the invention;

FIG. 8 illustrates the effect of applying a radio-frequency magnetic field to an element of food pasta to be dried;

FIG. 9 is a wiring diagram of a supply circuit of the electrodes of FIG. 7;

FIG. 10 illustrates a second type of electrode that is usable in a plant for producing dry pasta according to the invention.

DESCRIPTION OF PREFERRED EMBODIMENTS

Figure 1:
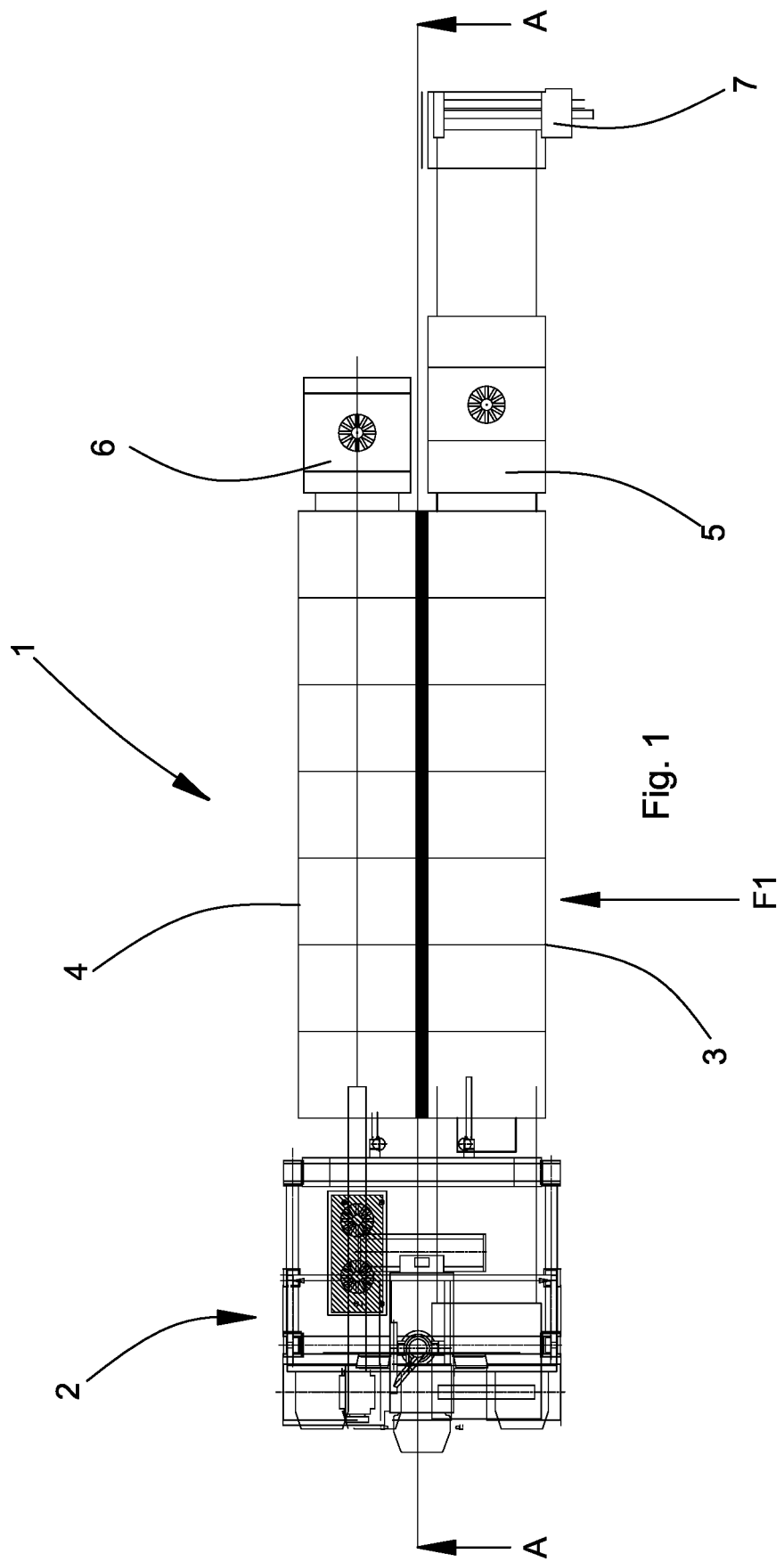
FIG. 1 is a plan view of a first embodiment of a plant for producing dry pasta according to the invention.

Below, the food pasta can be referred to for the sake of brevity as pasta.

According to the present invention, a method is provided for drying food pasta made from durum wheat flour, or from mixtures of durum wheat flour and soft wheat flour that includes the following steps:

preparing with durum wheat flour, or soft wheat flour, and water a dough having humidity comprised between 25% and 35%;

placing the dough in a chamber in which a vacuum is created comprised between 0.1 bar and 0.5 bar;

pushing the dough through a drawing device by applying to the dough a pressure comprised between 80 bar and 110 bar, to obtain food pasta P in the form of units of long pasta or units of short pasta;

conveying and delivering said units of pasta P to a dryer 3, 4;

drying said pasta P in said dryer 3, 4 until the humidity of the pasta P is not greater than 12.5%, said drying including heating said pasta P in said dryer 3, 4 to a set temperature and maintaining the pasta at said set temperature for a set interval of time; extracting said dried pasta P from said dryer 3, 4;

wherein said heating is obtained by moving said pasta P inside an oscillating electromagnetic field having a frequency comprised between 10 MHz and 100 MHz.

During a first drying step, the pasta P is heated to a temperature that can be comprised between 55° C. and 80° C., for a set time that can be about 1 hour.

After said first drying step, a second drying step can be provided in which pasta is maintained at a temperature comprised between 45° C. and 65° C. for a further set interval of time that can be about 30 minutes.

During said first drying step and during said second drying step, a flow of air at ambient temperature can be sent to the pasta P to remove the humidity produced by evaporation of the water in the pasta P.

After said second drying step, the pasta P can be cooled by a flow of cooling air, until the temperature of the pasta is the same as the ambient temperature.

Before drying the pasta P, it is preferred to maintain the pasta P at a temperature above ambient temperature for a set time, such that residual humidity inside the pasta P is distributed as uniformly as possible in the mass of the pasta.

In the case of production of long pasta, before the start of the first drying step, it is preferred to subject the pasta P to a ventilation step, sending onto the pasta P a flow of air at a temperature comprised between 35° C. and 45° C.

The ventilation is used to dry the surface of the pasta P to reduce the plasticity thereof, in order to prevent the pasta being possibly elongated excessively through the effect of its own weight.

In one version of the method according to the invention, the pasta P is heated in an environment in which a vacuum comprised between 0.2 bar and 0.7 bar is created so as to be able to dry the pasta P at a temperature comprised 40 and 55° C. that is lower than the drying temperature at atmospheric pressure.

The method according to the invention may be used not only for drying food pasta, but also for drying any food product containing humidity, preferably in an environment in which a vacuum is created.

Drying in an environment at a pressure that is lower than atmospheric pressure permits operation at a reduced temperature maintaining unaltered the organoleptic properties of the pasta and further reducing drying time.

Figure 2:
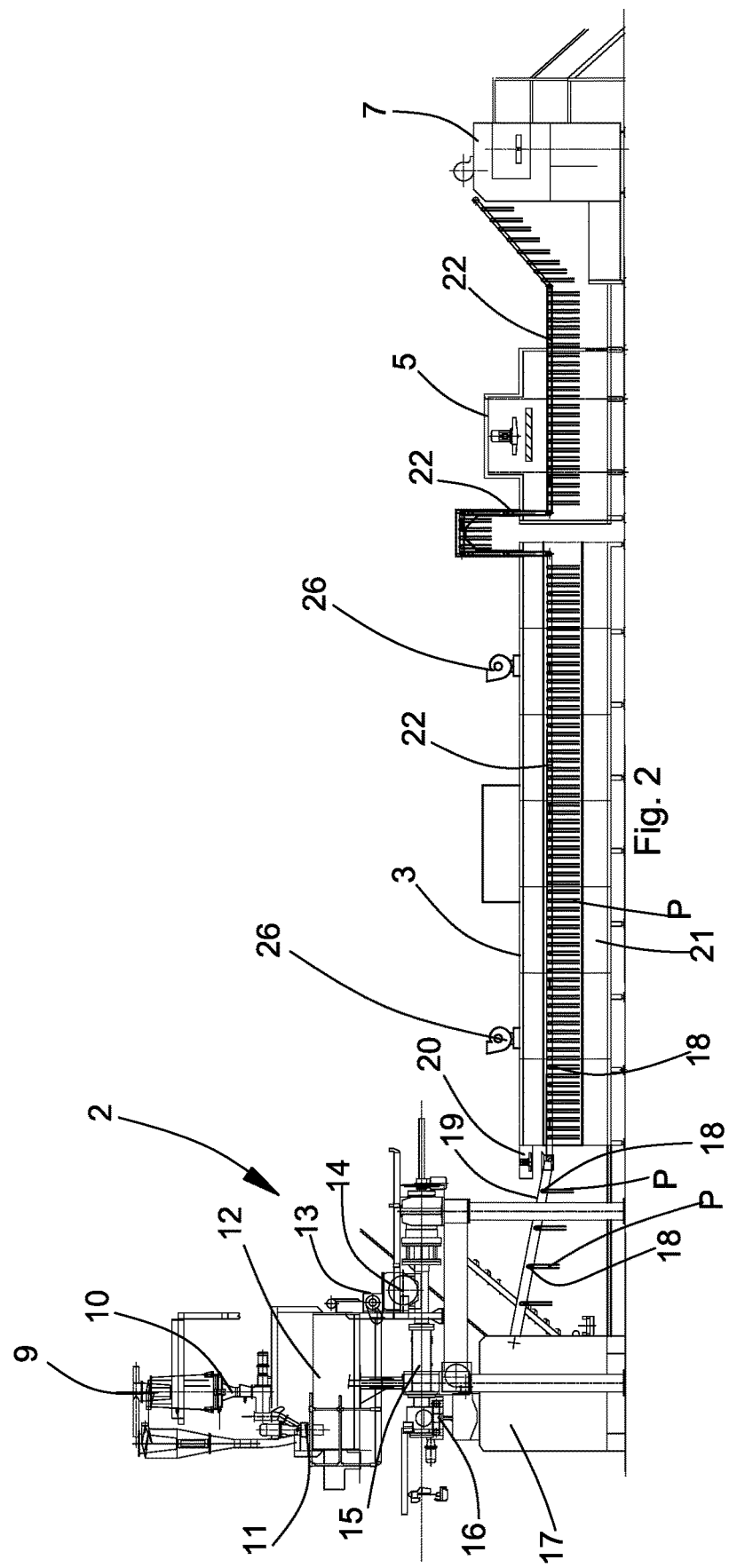
FIG. 2 is an elevation view of the plant in FIG. 1, from the side indicated by the arrow F1 in FIG. 1.
Figure 3:
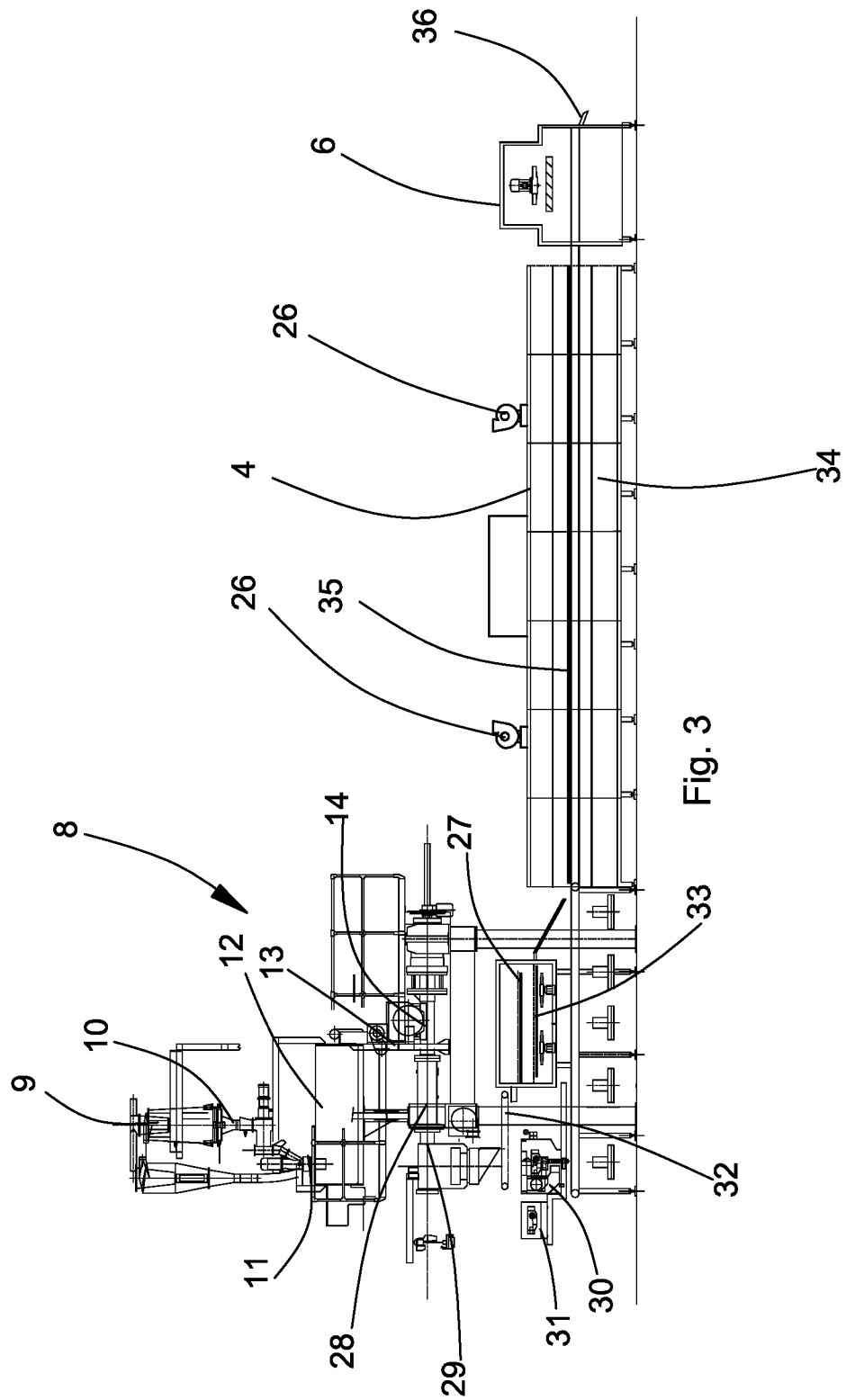
FIG. 3 is a section of the plant in FIG. 1, according to line A-A in FIG. 1.

In FIGS. 1, 2 and 3 an apparatus according to the invention is illustrated for producing both long pasta, such as for example spaghetti, bucatini, mafalde, candele or any other type of long pasta, and short pasta, such as for example maccheroni, penne, fusilli, conchiglie and any other type of short pasta.

With reference to FIG. 1, an apparatus 1 according to the invention includes a kneading and drawing device 2 that is able to produce both long pasta and short pasta, a first radiofrequency dryer 3 for drying long pasta, a second radiofrequency dryer 4 for drying short pasta, a first ventilating device 5 arranged after the exit of the first dryer 3, for cooling the long dried pasta exiting the first dryer 3, a second ventilating device 6 arranged at the exit of the second dryer 4, for cooling the short dried pasta exiting the second dryer 4.

The kneading and drawing device 2 comprises a decantation cyclone 9 into which the durum wheat flour or soft wheat flour is delivered. The decantation cyclone supplies a volumetric dosing device 10 that sends the durum and/or soft wheat to a centrifugal pre-kneading device 11 in which the durum or soft wheat is mixed with water to obtain dough from which the pasta will be obtained. The dough is made by mixing the durum or soft wheat, which normally has relative humidity comprised between 9% and 14%, with hot water between 30 and 45° C. in sufficient quantity to take the product's relative humidity to a value comprised between about 28% and about 35%.

From the pre-kneading device 11, the wet dough enters a kneader 12 in which complete absorption of the water by the durum wheat flour or soft wheat flour occurs, to obtain the dough from which the pasta will be obtained. Kneading lasts for a period of about 20 minutes, at the end of which the dough obtained is sent, through an airtight valve 13, to a vacuum tank 14, in which the air is removed from the dough, by a suction pump, that maintains in the tank 14 a pressure between 0.1 bar and 0.5 bar, to make the pasta shiny and devoid of imperfections after drawing.

From the vacuum tank 14, the dough can be sent to a first compression device 15 (FIG. 2) that supplies a first drawing device 16 for producing long pasta, or the dough can be sent to a second compression device 28 (FIG. 3), that supplies a second drawing device 29 for producing short pasta.

For producing long pasta, in the first compression device 15 the dough is pushed at pressure comprised between about 80 bar and about 110 bar through a drawing device by means of which a curtain of pasta units P is formed that are sent to a so-called stretching device, in which the pasta units P are drawn and positioned on support and conveying elements 18, for example in the form of rods or barrels, on each of which a plurality of pasta units P is loaded. The support and conveying elements 18 are loaded on a first conveying device 19 by means of which the support and conveying elements 18 with the pasta units P are conveyed to the first dryer 3 and loaded on a second conveying device 22 that conveys the support and conveying elements 18 with the pasta units P along a first drying tunnel 21 obtained inside the first dryer 3.

Before entering the first drying tunnel 21, the pasta P passes through a third ventilation device 20 in which the pasta is ventilated with air at a temperature comprised between about 35° C. and 45° C. to cause light drying of the outer surface of the pasta P, so as to reduce the plasticity thereof so as to prevent the pasta P undergoing excessive elongation because of its own weight.

In the first drying tunnel 21, pairs of electrodes 22, 23 (FIG. 7) are distributed in a substantially uniform manner between which an electromagnetic field is generated oscillating at a frequency comprised between about 10 MHz and about 100 MHz. The pasta P, by traversing the electromagnetic field between the pairs of electrodes 22, 23, is heated. The power applied to the electrodes to generate the oscillating magnetic field is adjusted so that the pasta is heated to a temperature comprised 55° C. and 75° C.

After a set interval of time of about an hour has elapsed, the power applied to the electrodes is reduced so as to reduce the temperature of the pasta P to a value comprised between about 45° C. and about 65° C., maintaining the pasta at this temperature for a further set interval of time of about another 30 minutes at the end of which the pasta will be dried, i.e. with a humidity percentage not greater than 12.5%, as required by legal standards. The expressions "about an hour" and "about 30 minutes" mean that said set interval of time and said further set interval of time can vary according to the size and thickness of the pasta P. In particular, said set interval of time is equal to 1 hour ±10% and said further set interval of time is equal to 30 minutes ±10%.

At the end of drying, the pasta P exits the first dryer 3 and is conveyed through the first ventilating device 5, in which the pasta P is cooled to ambient temperature.

Subsequently, the pasta P is conveyed to a removing and cutting device 7 in which the pasta units P are removed from the support and conveying elements 18 and cut to a standard length for packaging, equal to about 260 mm. From the removing and cutting device 7, the pasta P is then sent to a packaging apparatus (not illustrated).

For producing short pasta, the dough coming from the vacuum tank 14 is sent to the second compression device 28 into which the dough is pushed, at a pressure comprised between about 100 bar and about 105 bar, through the second drawing device 29, exiting from which the dough is cut into a plurality of units of short pasta by a cutting device, which is not shown. The drawing device 29 is interchangeable, depending on the type of short pasta that has to be produced.

The short pasta that is thus produced is sent to a screening device 27, known as "trabatto", in which the units of short pasta are separated from one another and dropped onto a fourth conveying device 33 by means of which the units of short pasta are conveyed to the inlet of the second dryer 4 where they move to a fifth conveying device 35 that transports the units of short pasta through a second drying tunnel 34 obtained inside the second dryer 4.

Also in the second drying tunnel 34 pairs of electrodes 22, 23 are distributed in a substantially uniform manner, between which an electromagnetic field is generated oscillating at a frequency comprised between about 10 MHz and about 100 MHz. The pasta P is heated by traversing the electromagnetic field between the pairs of electrodes 22, 23. The power applied to the electrodes to generate the oscillating magnetic field is so adjusted that the pasta is heated to a set temperature comprised 55° C. and 80° C.

The pasta P is maintained at the aforesaid set temperature for a period of about an hour at the end of which the pasta P is dried and stabilized, at a humidity percentage that is not greater than 12.5%, as required by law standards. The expression "about an hour" means that said set time can vary slightly depending on the size and thickness of the pasta P, in particular, said set time can be equal to 1 hour±10%.

If special pasta types have to be produced, like nest pasta or lasagne pasta, the following procedure is followed.

In the case of nest pasta, the pasta that exits the drawing device is sent to a so-called "nesting" device 30 from which pasta exits with a shape that simulates a nest. Subsequently, the pasta that is thus produced is dried by the same method disclosed above for the long pasta.

In the case of lasagne pasta, the pasta exiting the drawing device is sent to a so-called "lasagnatore" device 31 from which the pasta exits in the form of lasagne. Subsequently, the pasta that is thus produced is dried by the same method disclosed above for long pasta.

Heating the pasta by microwaves during drying has the advantage of obtaining very rapid and uniform heating of the pasta, with a gradient of about 1° C./s. Further, unlike hot air drying apparatuses, there is no need to pre-heat the environment in which drying has to occur until the drying temperature is reached.

Further, no pasta stabilization step is necessary at the end of drying.

It is possible to obtain short drying time, of little more than an hour, maintaining drying temperatures of no more than 80° C. so as to minimize degradation of the nutritional and organoleptic features of the pasta and to obtain pasta of high quality.

Lastly, the energy efficiency of a drying apparatus according to the invention is comprised between about 65% and about 70%, compared with the energy efficiency of a hot air drying apparatus according to the prior art, which is comprised between about 10% and 35%. This permits a great saving in the operating costs of an apparatus according to the invention.

Figure 4:
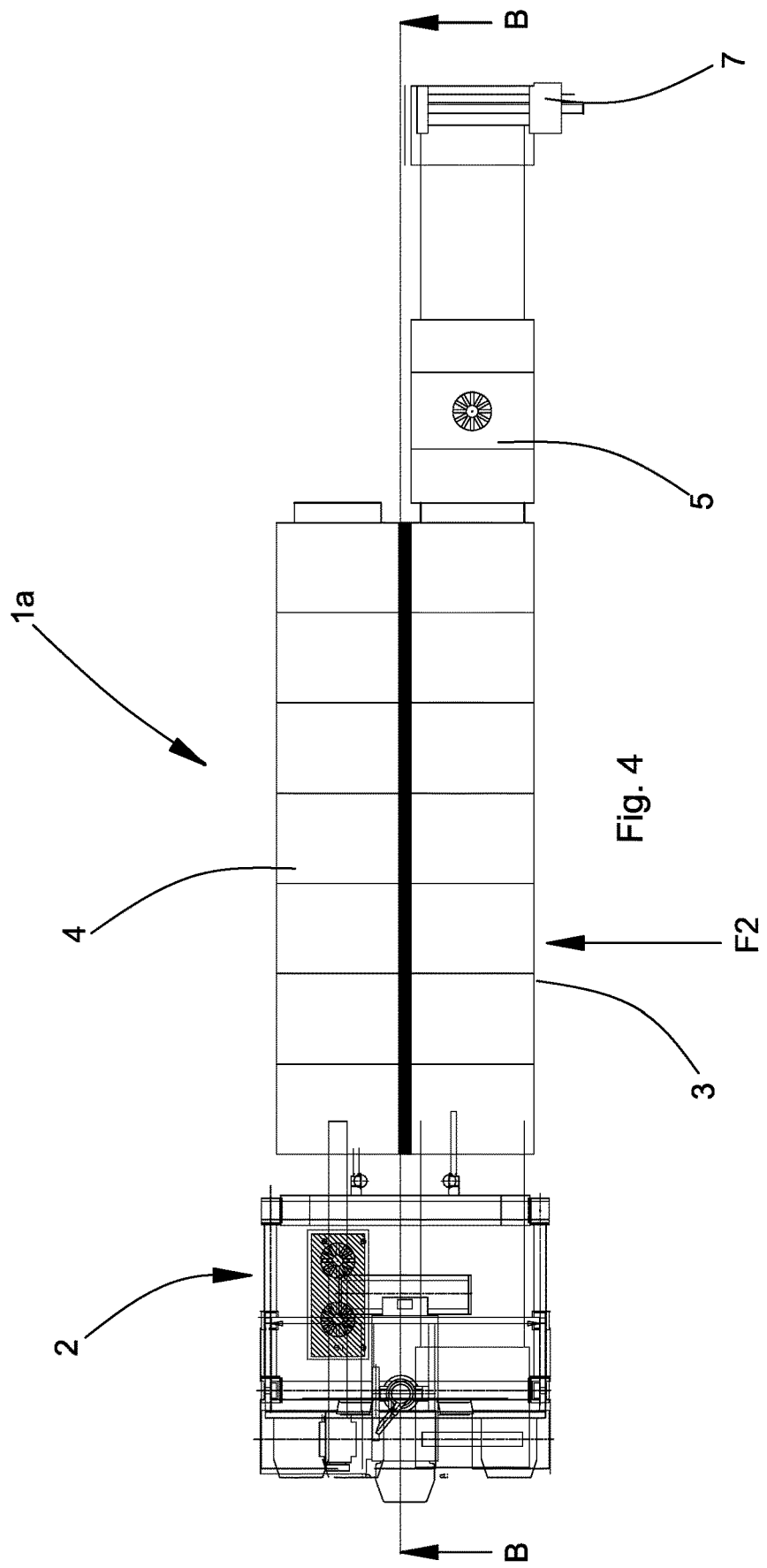
FIG. 4 is a top view of a second embodiment of a plant for producing dry pasta according to the invention.
Figure 5:
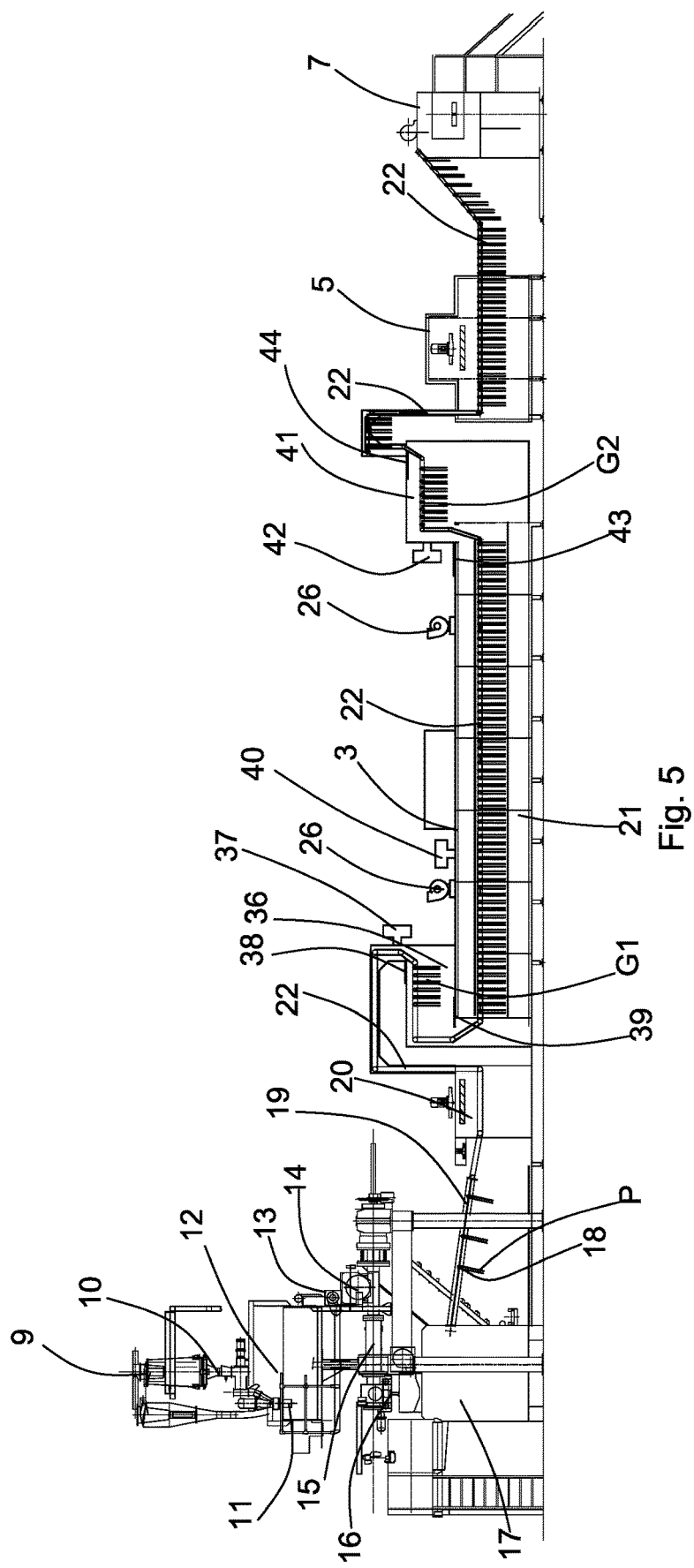
FIG. 5 is an elevation view of the plant in FIG. 4, from the side indicated by the arrow F2 in FIG. 4.

In FIGS. 4, 5 and 6, a variant 1_a_ of a drying apparatus according to the invention is illustrated.

The drying apparatus 1_a_ according to the invention differs from the apparatus 1 illustrated in FIGS. 1, 2 and 3 by the fact that the first drying tunnel 21 and the second drying tunnel 34 are maintained under vacuum. In order to maintain under vacuum the first drying tunnel 21, the first dryer 3 is equipped with at least one first vacuum pump 40. The second dryer 4 is equipped with at least one second vacuum pump 48 to maintain the second drying tunnel 34 under vacuum.

The elements of the apparatus 1_a_ that are the same as corresponding elements of the apparatus 1 illustrated in FIGS. 1, 2 and 3, are marked by the same reference numbers used in FIGS. 1, 2 and 3.

With reference to FIG. 5 that relates to the part of apparatus 1 _a_ intended for producing long pasta, the pasta units P supported on the support and conveying rods 18 and coming from the third ventilation device 20 are introduced into a loading chamber 36 of the first dryer 3. The loading chamber 36 is equipped with a first sliding baffle 38 placed at the inlet of the loading chamber 36 and with a second sliding baffle 39 placed at the outlet of the loading chamber 36. Said first sliding baffle 38 is movable between an open position in which it places the loading chamber 36 in communication with an outer environment at atmospheric pressure and a closed position in which it hermetically isolates the loading chamber 36 from the outer environment. The second sliding baffle 39 is movable between an open position, in which it places the loading chamber 36 in communication with the first drying tunnel 21, and a closed position in which it hermetically isolates the first drying tunnel 21 from the loading chamber 36. The second sliding baffle 39 is normally in a closed position in order to maintain under vacuum the first drying tunnel 21 of the first dryer 3. The loading chamber 36 is further equipped with a third vacuum pump 37 that is intended to create a vacuum inside the loading chamber 36.

The support and conveying elements 18, each of which carries a plurality of long pasta units P, are introduced in groups into the loading chamber 36, each group G1 comprising, for example, from 10 to 30 support and conveying elements 18. During the introduction of the support and conveying elements 18 to the loading chamber 36, the first sliding baffle 38 is in the open position to enable the rods 18 to be introduced, whilst the second sliding baffle 39 is in the closed position.

After a group G1 of support and conveying elements 18 has been introduced into the loading chamber 36, the first sliding baffle 38 is moved to the closed position, sealingly hermetically the loading chamber and the third vacuum pump 37 is started to create in the loading chamber 36 a vacuum comprised 0.2 bar and 0.7 bar, substantially the same as the vacuum that is created and maintained in the first drying tunnel 21 of the first dryer 3 by the first vacuum pump 40.

When the pressure in the loading chamber 36 is the same as the pressure inside the first drying tunnel 21 of the first dryer 3, the second sliding baffle 39 is opened to deliver to the first drying tunnel 21 the group G1 of support and conveying elements 18. After delivering the group G1 of support and conveying elements 18 to the first drying tunnel 21, the second sliding baffle 39 is returned to the closed position, to seal the first drying tunnel 21, then air is delivered to the loading chamber 36 to restore therein pressure equal to atmospheric pressure and the first sliding baffle 38 is taken to the open position, to be able to deliver to the loading chamber 36 a new group G1 of support and conveying rods 18 with the respective pasta units P.

The pasta P inside the first drying tunnel 21 moves between the pairs of electrodes 22, 23 between which an electromagnetic field is generated oscillating at a frequency comprised between about 10 MHz and about 100 MHz. The pasta P, by traversing the electromagnetic field between the pairs of electrodes 22, 23, is heated. The power applied to the electrodes to generate the oscillating magnetic field is adjusted so that the pasta is heated to a temperature comprised 40° C. and 55° C. Owing to the vacuum maintained in the first drying tunnel 21, which promotes evaporation of the humidity contained in the pasta, it is possible to dry the pasta P at a significantly lower temperature than the temperature at which the pasta P is dried in the drying apparatus 1 illustrated in FIGS. 1, 2 and 3, which enables the organoleptic properties of the pasta to be maintained substantially unaltered, because the temperature used during drying of the pasta in the first vacuum drying tunnel 21 is lower than 60° C., the temperature at which the gluten, the proteins and the amino acids of the pasta start to degrade. This enables pasta of very high quality to be obtained.

The dwell time of the pasta P in the first drying tunnel 21 is about an hour, in particular 1 hour±10%, at the end of which the pasta will be dried and stabilized, with a humidity percentage not greater than 12.5%, as required by legal standards.

The first dryer 3 is equipped, at the outlet of the first drying tunnel 21, with an unloading chamber 41 through which the dried pasta P can be unloaded from the first drying tunnel 21 to an outer environment at atmospheric pressure.

The unloading chamber 41 is equipped with a third sliding baffle 43 placed at the inlet of the unloading chamber 41 and with a fourth sliding baffle 44, placed at the outlet of the unloading chamber 41. The third sliding baffle 43 is movable between an open position, in which it places the first drying tunnel 21 in communication with the unloading chamber 41, and a closed position in which it hermetically isolates the unloading chamber 41 from the first drying tunnel 21. The fourth sliding baffle 44 is movable between an open position, in which it places the unloading chamber 41 in communication with the outer environment, and a closed position in which it hermetically isolates the unloading chamber 41 from the outer environment. The third sliding baffle 43 is normally in the closed position to maintain the vacuum inside the first drying tunnel 21. The unloading chamber 41 is further provided with a fourth vacuum pump 42 that is intended to create a vacuum inside the unloading chamber 41.

In order to unload from the first drying tunnel 21 a group G2 of support and conveying elements 18 with the respective dried pasta units P, the fourth baffle 44 is placed in the closed position, maintaining in the closed position the third baffle 43, then the fourth vacuum pump 42 is started up to create inside the unloading chamber 41 a vacuum equal to the vacuum inside the first drying tunnel 21. When the pressure in the unloading chamber 41 is equal to the pressure in the first drying tunnel 21, the third sliding baffle 43 is placed in the open position and a group G2 of support and conveying elements 18, with the respective pasta units P, is introduced inside the unloading chamber 41. Subsequently, the third baffle 43 is returned to the closed position sealing the first drying tunnel 21, air is delivered to the unloading chamber 41 to restore therein a pressure equal to the atmospheric pressure and the fourth sliding baffle 44 is brought to the open position, to be able to extract from the unloading chamber 41 the group G2 of support and conveying elements 18 with the respective dried pasta units P and send the support and conveying elements 18 to the removing and cutting device 7 in which the pasta units P are removed from the support and conveying elements 18 and cut to a standard length for packaging, equal to about 260 mm. From the removing and cutting device 7, the pasta P is then sent to a packaging apparatus (not illustrated).

Owing to the relatively low temperature at which drying of the pasta occurs, it is possible to do without the first ventilating device 5 for cooling the pasta P and let the pasta cool spontaneously. It is nevertheless possible to use the first ventilating device to accelerate cooling of the pasta.

With reference now to FIG. 6, relating to the part of apparatus intended for producing short pasta, the short pasta coming from the drawing device 29 is sent to the screening device 27, known as "trabatto", in which the single units of short pasta are separated from one another and dropped onto the fourth conveying device 33 by means of which the units of short pasta are conveyed to a loading device 45, 46, 47 by which the units of short pasta are delivered to the second drying tunnel 34 of the second radio frequency dryer 4, inside which a vacuum is made comprised between 0.2 bar and 0.7 bar by the second vacuum pump 48.

The loading device 45, 46, 47 comprises a loading hopper 45 into which the units of short pasta coming from the fourth conveying device 33 are delivered; the loading hopper 45 communicates below with a sealed first star valve 46 by means of which the units of short pasta are delivered to a zig-zag chute 47 that communicates with the second drying tunnel 34. The units of short pasta drop by gravity along the zig-zag chute 47 that slows the fall and join the fifth conveying device 35 to be conveyed along the second drying tunnel 34.

The units of short pasta move between the pairs of electrodes 22, 23, between which an electromagnetic field is generated oscillating at a frequency comprised between about 10 MHz and about 100 MHz. The pasta P, by traversing the electromagnetic field between the pairs of electrodes 22, 23, is heated. The power applied to the electrodes to generate the oscillating magnetic field is adjusted so that the pasta is heated to a temperature comprised 40° C. and 55° C. Owing to the vacuum maintained in the second drying tunnel 34, that promotes evaporation of the humidity contained in the pasta, it is possible to dry the pasta P at a significantly lower temperature than the temperature at which the pasta P is dried in the drying apparatus 1 illustrated in FIGS. 1, 2 and 3, which enables the organoleptic properties of the pasta to be maintained substantially unaltered, because the drying temperature of the pasta in the second vacuum drying tunnel 34 is lower than 60° C., the temperature at which the gluten, the proteins and the amino acids of the pasta start to degrade. This enables pasta of very high quality to be obtained.

The dwell time of the pasta P in the second drying tunnel 34 is about an hour, in particular 1 hour±10%, at the end of which the pasta is dried and stabilized, with a humidity percentage not greater than 12.5%, as required by legal standards.

The second dryer 4 is equipped with an unloading device 49, 50. 51 which enables the dried pasta to be unloaded from the second vacuum drying tunnel 34 to an environment at atmospheric pressure. The unloading device 49, 50, 51 comprises an unloading hopper 49 communicating with the second drying tunnel 34, into which the fifth conveying device 35 delivers the now dried units of short pasta. The unloading hopper 49 communicates below with a second zig-zag chute 50 through which the units of short pasta reach by gravity a second sealed star valve 51 that unloads the units of short pasta onto an outlet chute 52 in an environment at atmospheric pressure, for subsequent transfer to a packaging apparatus (not illustrated).

In FIGS. 7 and 8 a pair of electrodes 23, 24 is illustrated by means of which an electromagnetic field oscillating at a frequency comprised 10 MHz and 100 MHz is applied to pasta units P that transit between the electrodes.

The electrodes are supplied by a generator 54 of oscillating magnetic field, connected to the pairs of electrodes 23, 24 by coaxial cables 60 that are shielded to avoid interference with the electromagnetic field generated by the generator 54, the lines 53 of which are shown in FIGS. 7 and 8. In FIG. 8 the humidity that exits from the surface of the pasta P through the effect of the heating caused by the oscillating magnetic field is symbolized by the small arrows, which are indicated by the reference number 55.

In FIG. 9 the generator 54 of oscillating magnetic field is schematized. The generator 54 is supplied with direct current by a rectifier 57, which is in turn supplied by a normal alternating current grid 56, for example 220 V at a frequency of 50 Hz. The rectifier 57 supplies a circuit 58 generating an oscillating electromagnetic field, which is connected to the pairs of electrodes 23, 24. Between the circuit 58 generating an oscillating magnetic field and the pairs of electrodes 23, 24 an impedance adapter circuit is interposed 59, which results in the impedance seen from the generator 54 of oscillating magnetic field having a set constant value, to compensate for possible impedance variations of the load consisting of the pairs of electrodes 23, 24 with the respective coaxial supply cables 60 and the pasta units that transit between the electrodes 23, 24.

The electrodes 23, 24 of each pair of electrodes can be arranged aligned between themselves, as illustrated in FIGS. 7 and 8, or staggered, as illustrated schematically in FIG. 10 that shows a series of pairs of electrodes 23, 24, with the electrodes of each pair staggered in relation to one another. The pairs of electrodes are arranged in sequence along the path of the pasta P in the first drying tunnel 21, or in the second drying tunnel 34.

A distance D between the electrodes of each pair can be constant or adjustable to adapt to the thickness of the pasta units P.

The invention claimed is:

1. A method for producing dry food pasta comprising the following steps:
    preparing with durum wheat flour; or soft wheat flour and water a dough having a humidity between 25% and 35%;
    placing the dough in a chamber in which a vacuum between 0.1 bar and 0.5 bar is created;
    pushing the dough through a drawing device by applying to the dough a pressure between 80 bar and 110 bar; to obtain food pasta in the form of units of pasta of first or second lengths;
    conveying and delivering said pasta to a dryer;
    drying said pasta in said dryer until the humidity of the pasta is less than 12.5%, said drying step comprising heating said pasta in said dryer to a first temperature and maintaining the pasta at said first temperature for a first interval of time and subsequently heating said pasta in said dryer to a second temperature and maintaining the pasta at said second temperature for a second period of time;
    extracting said dried pasta from said dryer;
    wherein said first heating and said second heating are obtained by passing said pasta inside an oscillating electromagnetic field having a frequency between 10 MHz and 100 MHz.

2. The method according to claim 1, further comprising the step of adjusting the intensity of said oscillating magnetic field according to said first and second temperatures.

3. The method according to claim 1, wherein said first temperature is between 55° C. and 75° C.

4. The method according to claim 1, wherein said first temperature is between 55° C. and 80° C.

5. The method according to claim 2, wherein said first temperature is between 55° C. and 80° C. and said second temperature is between 45° C. and 65° C.

6. The method according to claim 1 wherein said first interval of time is equal to 1 hour ±10%.

7. The method according to claim 5 wherein said second interval of time is equal to 30 minutes ±10%.

8. A method for producing dry food pasta comprising the following steps:
    preparing with durum wheat flour or soft wheat flour and water a dough having a humidity between 25% and 35%;
    placing the dough in a chamber in which a vacuum between 0.1 bar and 0.5 bar is created;
    pushing the dough through a drawing device by applying to the dough a pressure between 80 bar and 110 bar to obtain food pasta in the form of units of pasta of first or second lengths;
    conveying and delivering said pasta to a dryer;
    drying said pasta in said dryer until the humidity of the pasta is less than 12.5%, said drying step comprising heating said pasta in said dryer in an environment in which a vacuum is created to a set temperature and maintaining the pasta at said set temperature for a set interval of time; and
    extracting said dried pasta from said dryer:
    wherein said heating is obtained by passing said pasta inside an oscillating electromagnetic field having a frequency between 10 MHz and 100 MHZ;
    wherein said heating occurs in an environment in which a vacuum is created.

9. The method according to claim 8, wherein said vacuum during said heating is between 0.2 bar and 0.7 bar.

10. The method according to claim 8, wherein said set temperature is between 40° C. and 55° C.

* * * * *